Jan. 24, 1967  C. E. KRAUS  3,299,744
TOROIDAL-TYPE TRANSMISSION
Filed Sept. 4, 1963  3 Sheets-Sheet 1
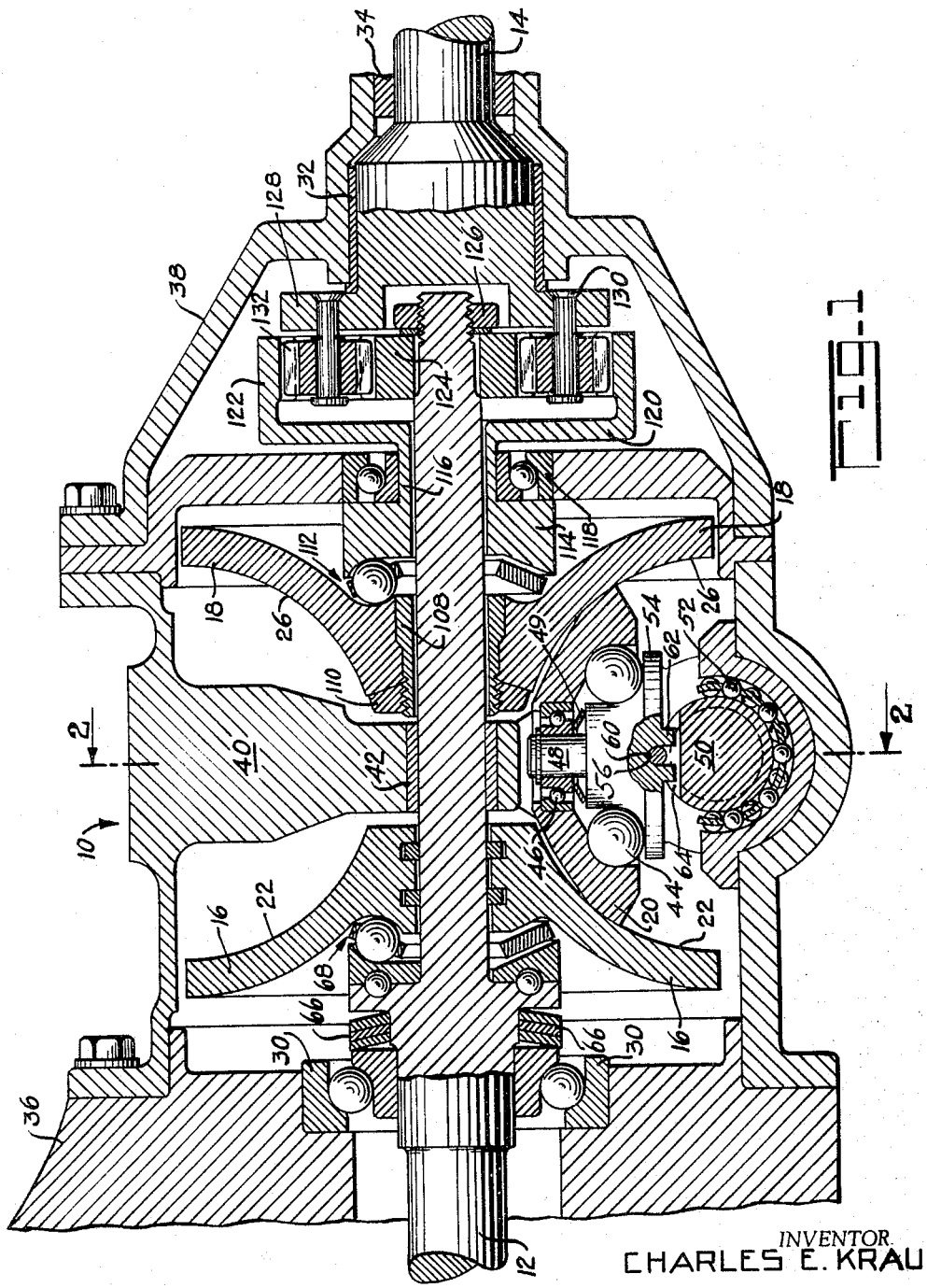
INVENTOR.
CHARLES E. KRAUS
BY Julian Balk
ATTORNEY

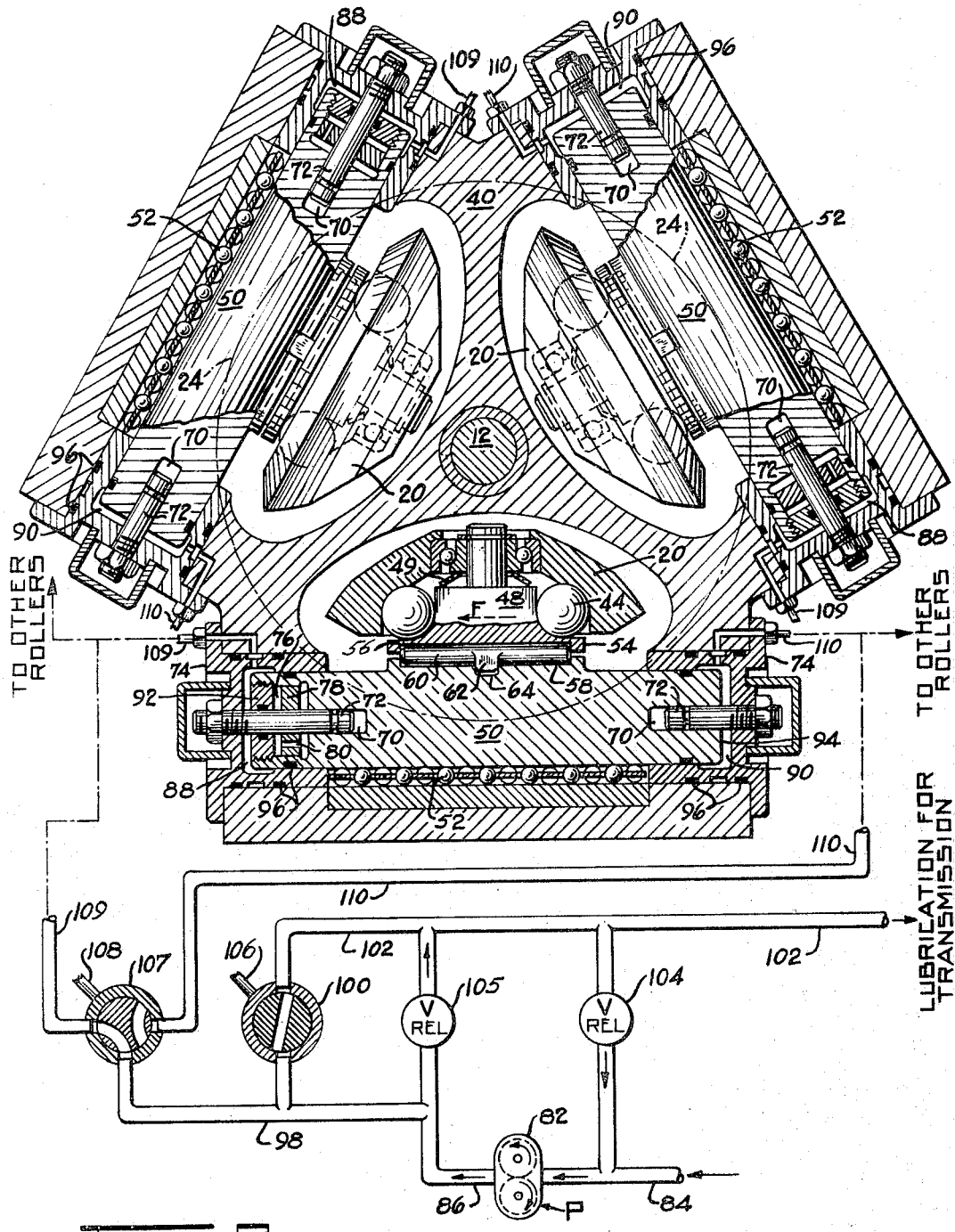

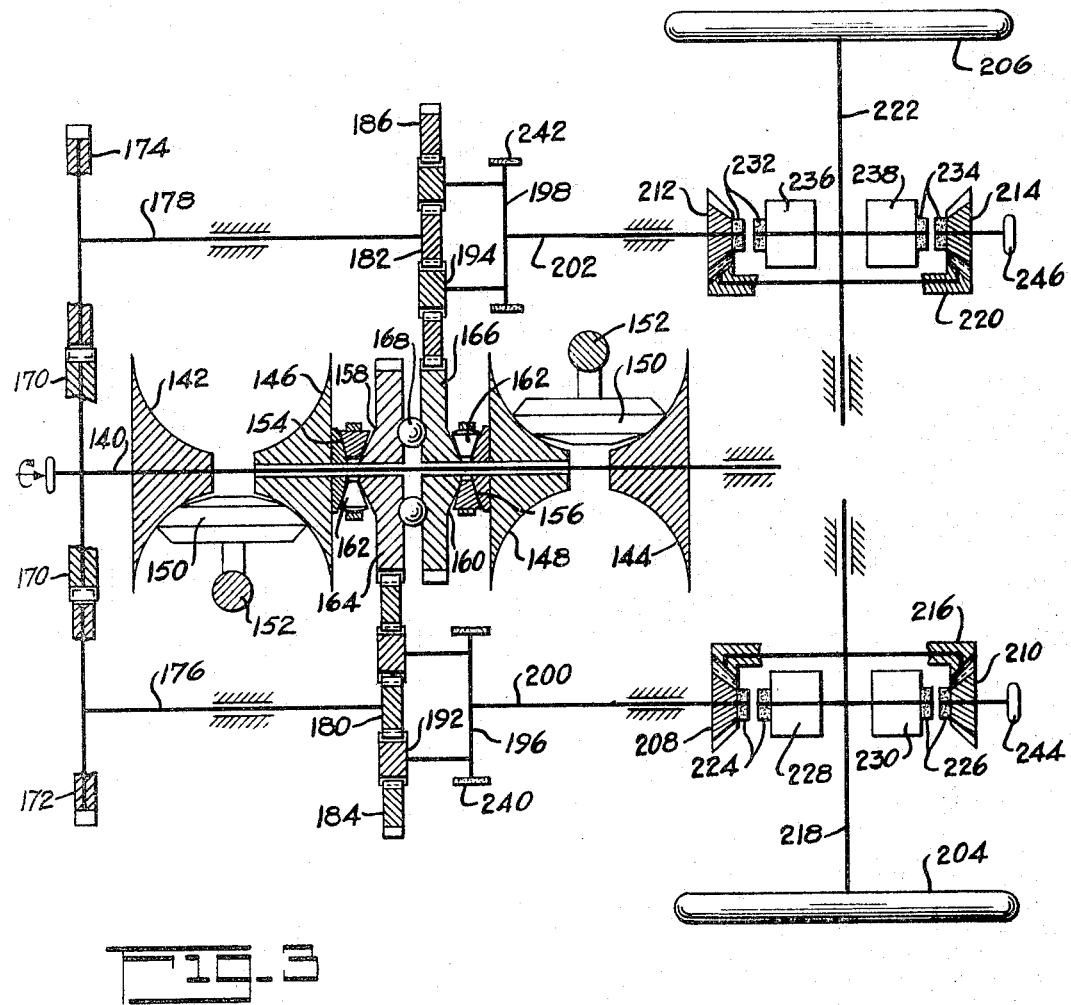

United States Patent Office 3,299,744
Patented Jan. 24, 1967

3,299,744
TOROIDAL-TYPE TRANSMISSION
Charles E. Kraus, Franklin Lakes, N.J., assignor to Excelermatic, Inc., a corporation of New York
Filed Sept. 4, 1963, Ser. No. 306,561
3 Claims. (Cl. 74—720.5)

This invention relates to toroidal-type transmissions and in particular to a transmission for vehicle use.

Toroidal transmissions generally comprise a pair of co-axial input and output drive members having facing toroidal surfaces with a plurality of rollers disposed between and in friction contact with such surfaces and with each roller mounted for speed-ratio changing movement to change a speed-ratio of the driving connection provided by the rollers between the toroidal members. A transmission of this type is clearly disclosed in my prior Patent 3,008,337, issued November 14, 1961.

The present invention provides a novel means for varying the speed and direction of rotation of the output shaft relative to the speed and direction of rotation of the input shaft while requiring no transmission clutches, brakes or separate means for reverse drive. The invention is generally carried out through the use of a hydraulic control system for hydraulically controlling the speed-ratio position of the rollers through variation in the hydraulic pressure and thus the relative speed of the output toroidal drive member. In one embodiment of the invention the output toroidal drive member is drivingly connected to a ring gear of a planetary gear system so that the speed of rotation of the ring gear relative to the input shaft can be varied by varying the hydraulic pressure applied for controlling the roller speed-ratio position. The output shaft of the transmission carries a plurality of planet pinion gears which mesh with a ring gear and also with a sun gear fixed to the transmission input shaft. Thus, as will be more clearly explained in the following detailed description, by varying the speed of the ring gear relative to that of the input shaft through the hydraulic control both the speed and direction of rotation of the transmission output shaft can be regulated.

In a second embodiment of the invention a novel arrangement is provided for vehicle use wherein a transmission output is provided for each of a pair of vehicle drive wheels without requiring a differential. A separate output toroidal drive member is connected to a separate planetary gear system of the type utilized in the prior-mentioned embodiment of the invention, there being one such output toroidal drive member and planetary gear system for each drive wheel of the vehicle. Also, as in the case of the prior-mentioned embodiment, the speed-ratio position of the rollers is controlled through a hydraulic control system which also serves to control the speed of the ring gear for each planetary gear system and thereby regulates the rotation of the transmission output shafts for each of the vehicle drive wheels.

Accordingly it is one object of the invention to provide a novel and improved means for controlling the output speed and direction of rotation in a toroidal-type transmission.

It is another object of the invention to provide a novel and improved control system for a toroidal transmission wherein forward, reverse and neutral driving ranges may be selected without the requirement of any transmission clutches, brakes or separate reverse gearing.

It is a further object of the invention to provide a novel and improved control system for a toroidal transmission wherein a novel cooperative relationship is provided between a fluid pressure control system and a planetary gearing system for controlling the speed and direction of the transmission output.

It is still another object of the invention to provide a novel and improved control system for a toroidal transmission including a separate transmission output for each drive wheel of a vehicle so that one drive wheel may rotate at different speeds relative to another drive wheel without requiring a supplemental axle differential.

It is an additional object of the invention to provide a novel and improved hydraulic control system for a toroidal transmission with said hydraulic control system cooperating with a first toroidal drive means and planetary gear system for driving one drive wheel of a vehicle and with a second toroidal drive means and planetary system for driving a second drive wheel of the vehicle.

The objects and advantages of the invention will become apparent upon reading the following detailed description with the accompanying drawing wherein:

FIG. 1 is an axial sectional view through the transmission illustrating one embodiment of the invention;

FIG. 2 is a sectional view taken along the line 2—2 of FIG. 1, and

FIG. 3 is a diagrammatic view of a transmission system illustrating another embodiment of the invention.

Referring to FIGS. 1 and 2 of the drawings, a transmission 10 is illustrated having co-axial input and output shafts 12 and 14 respectively, input and output toroidal disc members 16 and 18 co-axially mounted relative to the axis of the input shaft 12, with disc 16 being drivably connected to input shaft 12 and disc 18 being rotatable relative to the input shaft 12 and a plurality of circumferentially-spaced rollers 20 disposed between and in driving engagement with the toric surfaces of the disc members 16 and 18. Preferably, as illustrated in FIG. 2, three rollers 20 are provided between the toroidal disc members 16 and 18 although the invention is not limited to this number. At least one of the toroidal disc members is axially moveable toward the other and in the embodiment illustrated in FIG. 1 both of the toroidal disc members 16 and 18 are axially moveable relative to one another and are supported on input shaft 12 for relative axial movement along said input shaft 12.

The input toroidal disc member 16 has a toroidal surface 22 which preferably is generated by rotating a substantially circular arc about the common axis of the input and output shafts 12 and 14, the center of the generating arc tracing the circle 24 as the toric surface 22 is generated. The output toroidal disc member 18 has a similar toroidal surface 26 facing the input toroidal surface 22 and having substantially the same toric center circle 24.

The shafts 12 and 14 are supported by bearings 30, 32, and 34, respectively, in a multi-part housing including end sections 36 and 38 and an intermediate section 40 secured to said end sections. The intermediate housing section 40 is a Y-shaped frame structure between which the three rollers 20 are disposed, said Y-shaped structure providing a bearing support 42 for the intermediate portion of the shaft 12.

Each roller 20 is journaled by bearings 44 and 46 on a spindle 48, said bearings being designed to support its roller against radial loads and to support its roller 20 against thrust radially outward along its spindle 48, the axis of each said spindle 48 being substantially radial relative to the transmission axis. A spring 49, preferably in the form of a Belleville washer, is disposed between the inner race of the bearing 46 and a shoulder on the spindle 48 so that the axial thrust on the roller 20 serves through its bearing 46 to compress the spring 49 thereby to distribute the axial thrust between the bearings 44 and 46. Since the Belleville spring 49 is between the bearing 46 and the spindle 48 it serves to limit the thrust load carried by said bearing 46, said bearing 46 having a substantially smaller load carrying capacity than the bearing 44.

Each roller spindle 48 is supported by a pivot shaft 50 for movement in a first mode to provide speed-ratio-changing movement of its roller about the axis of its said pivot shaft and relative to the toric surfaces 22 and 26. Relative to the transmission axis, each roller 20 is disposed on the radially inner side of its associated pivot shaft 50. The axis of each pivot shaft 50 is substantially tangent to the toroidal center circle 24 and is disposed in a plane perpendicular to the transmission axis. Thus, the pivot shafts 50, like the rollers 20, are circumferentially-spaced about the transmission axis, there being one pivot shaft 50 for each roller. Each pivot shaft 50 is supported on a substantially semi-cylindrical bearing 52 carried by the intermediate housing section 40 in a manner clearly illustrated in FIGS. 1 and 2. A more detailed description of the specific type bearing, such as bearing 52, may be found in my co-pending application entitled "Roller Support Mechanism for Toroidal Drive," Serial No. 266,363, filed March 19, 1963, now U.S. Patent No. 3,159,042, issued on December 1, 1964.

Each roller spindle 48 has an end plate 54 having a substantially semi-cylindrical groove 56 facing a corresponding groove 58 in the surface of a central portion of its associated pivot shaft 50. Each such semi-cylindrical groove 56 and 58 is disposed parallel to the axis of its associated pivot shaft 50. A pin 60 is received in each facing pair of grooves 56 and 58 so that through its pin 60 the associated roller 20 is supported by the shaft 50 for speed-ratio-changing movement of the roller with and about the axis of its shaft 50.

Each pin 60 also permits a limited pivotal movement of its associated roller 20 about the axis of said pin to equalize the contact pressures of said roller against the toric surfaces 22 and 26.

Each pivot shaft 50 has a limited movement along its axis and its associated roller spindle end plate 54 has tongues or lugs 62 received within a cross-slot or groove 64 in the shaft 50 so that movement of a shaft 50 along its axis results in a corresponding movement of its roller 20 in this direction which may be termed, movement in a second mode. Obviously, since the cross-slot 64 on each pivot shaft 50 is disposed at right angles to the adjacent pin 60, this engagement between each pivot shaft cross-slot 64 and the roller spindle lugs 62 does not interfere with limited pivotal movement of the associated roller spindle 54 about the axis of the pin 60 to equalize the contact pressures of the associated roller 20 against the toric surfaces 22 and 26.

The direction of rotation of the transmission is such that as viewed in FIG. 2 the input toric member 16 rotates clockwise and therefore the traction forces F exerted by the toric members 16 and 18 on, for example, the lower roller 20 are directed toward the left. Any unbalance of the traction forces F exerted by the toric surfaces 22 and 26 on a roller and the forces along and on the roller pivot shaft 50 results in movement of the roller and its pivot shaft 50 along the axis of said shaft. As fully explained in the aforementioned Patent 3,008,337 such second mode movement of a roller 20 along the axis of its pivot shaft 50 results in precession, or speed-ratio-changing pivotal movement of the roller with and about the axis of its pivot shaft 50 to a speed-ratio position in which said forces are again in balance.

As is known, speed-ratio-changing precession of the rollers may also be produced by tilting of each roller about an axis through or parallel to a line through the points of contact of the roller with the toric members 16 and 18. As is also disclosed in said patent, if such a roller tilt axis is offset from a line through the roller points of contact with the toric members, then the traction forces exerted by the toric members 16 and 18 on each roller apply a turning moment on the roller about its tilt axis which may be balanced by a hydraulic control force. Accordingly, it is within the scope of this invention to use such roller tilting movement for the roller second mode movement to induce speed-ratio-changing precession of the rollers instead of shifting of each roller along the axis of its pivot shaft 50.

A Belleville washer 66 along with a cam and sprag device 68 may also be provided as illustrated in FIG. 1 for axially loading the input disc 16 toward output disc 18 so that friction contact will be maintained between discs 16, 18 and rollers 20 during operation. Reference may be made to United States Patent 3,048,047 for a more complete description of the washer 66 and cam and sprag device 68. It should of course be understood that other suitable mechanisms may be utilized for axially loading the discs and the details of the cam and sprag device and Belleville washer form no part of the present invention.

As shown in FIG. 2, each pivot shaft 50 is provided with a cavity 70 in each axial end for receiving pins 72 therein with each said pin being secured to a fixed insert sleeve member 74 so that the pivot shaft 50 may translate relative to said pins 72 along its axis for initiating speed-ratio-changing movement of the rollers 20. An enlarged cavity 76 is provided in one end of each of the pivot shafts 50 and a damping piston 78 which is fixed to the associated pin 72 in said one pivot shaft end is positioned therein. The cavity 76 is closed at its axially outer end by a removable portion of the pivot shaft 50. A damping fluid fills the cavity 76 and the damping piston 78 is provided with a restricted passageway 80 therein so that a restricted flow of the damping fluid between the faces of the damping piston 78 occurs in response to sudden axial movements of the pivot shaft 50 for damping these sudden movements.

As stated above, a hydraulic control system is provided for regulating the speed-ratio position of the rollers 20 and consequently the relative speeds of the input and output toroidal members 16 and 18. As further shown in FIG. 2, the hydraulic control system may comprise a pump 82, which may be a suitable gear-type pump, having an inlet line 84 connected thereto at one side and an outlet line 86 at its other side. The inlet line 84 is connected to a fluid reservoir (not shown) and the pump 82 is suitably connected to a driving source in a well known manner, such as to the engine shaft or the transmission input shaft 12. The pump 82 supplies fluid under pressure to cylinders 88 and 90 defined between piston faces 92 and 94 on the pivot shafts 50 and their associated insert members 74, as will be explained in greater detail hereinafter. Suitable seal means 96, preferably of rubber-like material, are disposed within and around the periphery of each of the pivot shafts 50 and insert members 74 to prevent leakage of the hydraulic fluid around the pistons and between the insert members and housing 40.

The pump outlet line 86 supplies a high pressure line 98 which is in turn operatively connected to each of the cylinders 88 and 90 at each pivot shaft 50, as illustrated. A variable bypass valve 100 is effective when open to by-pass liquid from the output side of the pump 82 back to its input side through a low pressure line 102 and low pressure relief valve 104. The relief valve 104 is set for a relatively low pressure, as for example 30 p.s.i. A second pressure relief valve 105 connects the output line 86 of the pump 82 to the low pressure line 102 which pressure relief valve 105 is set for a relatively high pressure, as for example 300 p.s.i. The actual magnitude of the pressure in high pressure line 98 depends on the position of the variable by-pass valve 100 with the maxiumum value of the high pressure in line 98 being determined by the high pressure relief valve 105. The pressure in the line 102 is substantially constant depending on the setting of the low pressure relief valve 104 and the fluid pressure in the line 102 may be used for supplying lubricant to the transmission in a known manner. The pressure in high pressure line 98 is adjustable through variable by-pass valve 100 and is therefore under the control of valve 100 whereby the force exerted on the piston faces of each pivot shaft 50 and its associated roller 20 is variable to change the resultant force acting on each said pivot shaft. Thus an opening or closing adjustment of valve 100 effects a decrease or an increase, respectively, in the pressure exerted on each of the pivot shafts 50. During normal operation, as for example, for forward driving range, the fluid pressure on piston faces 92 exerts a greater force on the pivot shafts 50 and their rollers 20 than the force due to the traction forces F so that the pivotal movement of the rollers 20 is normally clockwise (FIG. 1) and opposes and normally balances the counter clockwise turning movement exerted on said rollers by the traction forces F. It should be understood however, that other types of variable hydraulic control mechanisms may be used for applying fluid control pressure in opposition to the tangential traction forces F. For example, a high pressure line having a fixed restriction followed by a variable pressure valve may be provided for applying a variable pressure to the cylinder 88.

If the valve 100 is rotated clockwise from its position shown in FIG. 2 or in a closing direction, the fluid pressure will change with the pressure exerted on each piston face 92 being such as to cause translational movement of its associated pivot shaft 50 and thus a pivoting of each roller 20. The rollers 20 will pivot relative to the disc members 16 and 18 so as to increase the speed of the output disc 18 relative to the input speed, that is, the point of contact of each roller 20 on the toroidal discs moves radially inwardly on the output disc surface 26 and radially outwardly on the input disc surface 22. Pivotal movement of the rollers 20 in response to the change in fluid pressure force will continue until the traction forces and the fluid pressure forces are again in balance.

An opening or counterclockwise adjustment of the valve 100 from its position illustrated in FIG. 2 will result in a decrease in fluid pressure in high pressure line 98 and thus a change in the fluid pressure acting on each piston face 92 whereupon the traction forces will unbalance the fluid pressure force acting on piston face 92 and cause movement of the rollers toward a position to decrease the speed of the output disc 18. In other words, the point of contact of each roller 20 on the toroidal discs now moves radially outwardly on the output disc surface 26 and radially inwardly on the input disc surface 22. This speed-ratio-changing movement of each of the rollers 20 results in a decrease in the toroidal disc traction forces on each roller so that said movement continues until the forces causing such roller movement are again in balance. Therefore, it will be apparent that, through adjustment of the valve 100 which controls the hydraulic pressure, the speed of the output disc 18 can be raised relative to the speed of the input disc 16 and the input shaft 12.

The variable by-pass valve 100 may be suitably connected to an accelerator control (not shown) through a link member 106 so that the valve 100 will regulate the pressure in high pressure line 98 in accordance with the position of the accelerator control selected by the operator. Thus, as the operator moves the accelerator control for an increase in speed, the valve 100 will be adjusted to increase the pressure in high pressure line 98 for applying a greater fluid pressure in one of the cylinders 88 or 90.

As illustrated the high pressure line 98 is connected to a selector valve 107 which in turn may be suitably connected to an operator selector switch (not shown) through link member 108. The selector valve 107 serves to connect high pressure line 98 to either line 109 connected to each cylinder 88 or to line 110 connected to each cylinder 90. Thus, with the selector valve 107 in the position illustrated in FIG. 2, the pressure from line 98 will be fed through the valve 107 to line 109 and to the cylinders 88 for initiating speed-ratio changing movement of the rollers in opposition to the tangential traction forces on the rollers 20. As will be explained in greater detail below, this will result in an increase in the speed of the output disc 18 relative to the speed of the input disc 16 and an increase in the relative speed of the transmission output shaft 14 in a direction of rotation for driving in a forward direction.

In a transmission of this type having a hydraulic control system in combination with a planetary gear system when the speed demand is reduced, and the hydraulic pressure is dumped or substantially reduced, the rollers will pivot in a direction in response to the tangential traction forces. However, at the same time, due to the load on the output shaft and the planetary gear system, a reverse torque will build up in the transmission which acts in opposition to the tangential traction forces. The rollers will therefore only pivot to a position wherein the force on the rollers due to the reverse torque load and the tangential traction forces are in balance which will be a position wherein the rotation of the output shaft will be at zero rotation or a neutral position. Thus, as long as the selector valve 107 is in the position illustrated in FIG. 2 for supplying fluid pressure to the cylinder 88, the output shaft will only rotate in one direction from a zero output speed, corresponding to a minimum fluid pressure force in cylinders 88, to a maximum output speed, corresponding to a maximum fluid pressure force in cylinders 88.

In order to reverse the direction of rotation of the output shaft 14, the rollers must be forced past the position wherein the tangential traction forces and the forces in opposition thereto are in balance. As illustrated in FIG. 2, the selector valve 107 may be rotated to a position wherein the high pressure line 98 will be connected to line 110 for supplying fluid pressure to the cylinders 90. By this means it will be seen that the fluid pressure force in the cylinders 90 will act in the same direction as the tangential traction forces so as to unbalance the forces in opposition thereto for initiating speed-ratio changing movement of the rollers in a direction wherein the speed of the input shaft 12 and the input disc 16 will increase relative to the speed of the output disc 18. As will be explained in greater detail below, the reaction through the planetary gear system will be such as to cause the output shaft 14 to rotate in a direction which is reverse to that when the selector valve was in the position shown in FIG. 2. Thus, it will be seen that through adjustment of the selector valve 107, the transmission may be shifted to forward and reverse output conditions and in either position of the selector valve 107 the transmission will automatically shift to a neutral condition when the hydraulic pressure is substantially reduced or dumped as through an adjustment of the variable by-pass valve 100 to reduce the pressure in line 98.

Referring again to FIG. 1, the output disc 18 is shown as fixed to an annular member or sleeve member 108 by nuts 110 or other suitable means, said sleeve member being journaled about the shaft 12 for relative rotation thereto. Rotary motion of output disc member 18 is transmitted through a cam and sprag device 112, similar to that shown at 68, to an annular member 114 which member 114 has camming surfaces thereon forming part of the cam and sprag device 112. The cam and sprag device 112 serves to transmit torque from the output shaft 14 into axial loading of the output disc 18 against the rollers 20. The annular member 114 has an axially-extending portion 116 surrounding the input shaft 12 with said axially-extending portion being supported on a portion of the transmission housing by a bearing 118. Integral with the axially-extending portion 116 or suitably fixed thereto is a radially-extending portion 120 from which, at its radially outward extent, there is connected to or integral therewith a ring gear 122. Thus, it will be seen that the ring gear 122 will rotate with and at the same speed as the output disc 18.

The input shaft 12 extends substantially the entire length of the transmission as shown in FIG. 1 and has fixed to its end adjacent the output side of the transmission a sun gear 124 which may be splined to shaft 12 and held thereon by a nut 126, said sun gear being co-axial with the ring gear 122. The output shaft 14 has a radially-extending flange portion 128 or carrier thereon to which there is fixed a plurality of trunnion members 130. A planet pinion gear 132 is rotatably supported on each trunnion member 130 and is in meshing engagement with the ring gear 122 and sun gear 124.

The planetary gear system comprising ring gear 122, sun gear 124 and planet pinion gears 132 is selected and arranged so that, at predetermined speeds of rotation of the ring gear 122 relative to the speed of rotation of the sun gear 124, the planet pinion gears 132 will be driven around the sun gear 124 and drive the output shaft 14 in a direction and at a speed which depends on the relative speeds of the ring gear 122 and sun gear 124. When the speed of the ring gear 122 is such that the planet pinions 132 will be driven around the sun gear 124, the direction of rotation of the output shaft 14 will be opposite to the direction of rotation of the input shaft 12 since the direction of rotation of the output disc 18 is reversed from the direction of rotation of the input disc 16 through the rollers 20. At speeds of the ring gear 122 relative to the speed of the sun gear 124 wherein the planet pinion gears 132 will be driven by the sun gear 124 with respect to ring gear 122, the output shaft 14 will be driven in a reverse direction relative to the direction of rotation of the ring gear 122 or in the same direction as input shaft 12 and at a speed depending on the relative speeds of the ring gear 122 and sun gear 124. The arrangement also provides for a range of relative speeds of the ring gear 122 and sun gear 124 wherein neither of these gears will drive the planet pinion gears 132 relative to the other and the planet pinion gears will merely rotate or idle on their trunnions 130 and thus no rotation will be imparted to the output shaft 14. Therefore, it may be stated that the output shaft will have a first direction of rotation, corresponding to the situation wherein the planet pinion gears 132 are driven by ring gear 122 around the sun gear 124, a second direction of rotation, corresponding to the situation wherein the sun gear 124 drives the planet pinion gears relative to ring gear 122, and a neutral position wherein the planet pinion gears 132 idle relative to the gears 122 and 124. It should be understood that these situations may be varied by changing the gear arrangement so that for any speed-ratio position of the rollers, the output shaft will always rotate in the same direction.

It will now be apparent that, through adjustment of the selector valve 107 and the by-pass valve 100 of the hydraulic control system, the speed of the output disc 18 relative to the speed of the input disc 16 can be controlled and thus the speed of the ring gear 122 relative to the speed of the sun gear 124 so that the operator may select the driving range and control the output speed. When the by-pass valve 100 is in its full open position, the pressure in high pressure line 98 will be substantially at its lowest value and therefore, the traction forces F and the force due to the reverse torque load will be balanced and the rollers will assume a position wherein the transmission output speed is zero. As the by-pass valve 100 is adjusted toward a closed position, the pressure in line 98 will increase for opposing the traction forces F and the rollers will pivot to a position wherein the hydraulic force and the traction forces F are again in balance. At the same time, the speed of the output disc 18 and ring gear 122 will increase relative to the speed of the input disc 16 and sun gear 124. As the by-pass valve 100 is adjusted so as to close down the by-pass valve the pressure in line 98 will become greater and will result in increasing the speed of ring gear 122 relative to the speed of the sun gear 124 so that the ring gear 122 will drive the planet pinions 132 around the sun gear 124 with the result that the output shaft 14 will now be driven in a direction corresponding to the direction of rotation of the ring gear 122 and at a speed depending on the speed of the ring gear 122 relative to the speed of the sun gear 124. It will therefore be apparent, that through manipulation of the selector valve 107 and the by-pass valve 100, the speed and direction of rotation of the output shaft 14 can be regulated through a first direction, to a direction of zero rotation and to a second direction of rotation. Operation of the transmission in a reverse or second direction of rotation is merely accomplished by changing the position of the selector valve 107 as explained above. Although it has been found that a change in the selector valve 107 to reverse the transmission output even at high speeds does not normally result in damaging the transmission, means may be provided, as an added safety factor, to prevent a sudden change in direction of output when the transmission is operating in a high speed range.

The combination of a planetary gear system with a toroidal transmission in itself is well known as shown by the patent to Chilton 2,493,571, issued on January 3, 1950. In the prior art combinations, such as that shown by Chilton, the rollers were adjusted to various speed-ratio positions through a mechanical linkage which mechanically locked the rollers at the particular setting. When a toroidal transmission having a planetary gear system is in the neutral driving range or, in other words, when the output shaft is at zero r.p.m. or approaching zero r.p.m., the torque being transmitted by the output shaft decreases until it reaches zero. Feed-back torque will then build up in the transmission and the tangential traction forces F between the rollers and toroidal discs will increase until the rollers are forced to slip on the discs which will result in destruction of the toroidal surfaces and the roller surfaces. It will be apparent that, when the output shaft is at zero r.p.m. and constant available horsepower is applied, the feed-back torque will approach infinity. Thus, the combinations of a toroidal transmission and planetary gearing of the prior art type proved to be impractical since there was no satisfactory way of compensating for the feed-back torque and the transmission eventually destroyed itself.

Applicant's novel combination of a toroidal transmission and planetary gearing with a hydraulic control solves the problem of compensating for feed-back torque and now makes toroidal transmission combinations with planetary gearing practical. As explained above, hydraulic pressure is applied to each roller pivot shaft for opposing the tangential traction forces thereon so as to initiate speed-ratio-changing movement of the rollers to a speed-ratio position wherein the forces on each roller will again be in balance. As also explained above, the hydraulic pressure in the hydraulic control system is limited. Therefore, if the rollers are in a speed-ratio position such that the output shaft is at zero r.p.m. and the feed-back torque begins to build up on any one or all of the rollers, the tangential traction forces F will increase and unbalance the hydraulic pressure force on the roller pivot shafts so that the rollers will now automatically shift toward a lower speed-ratio position to compensate for the increase in load on said rollers. Thus, it will be apparent that the forces on each of the rollers and toroidal discs will not increase to a point wherein slippage will occur and destruction of the rollers and toroidal discs due to overload will be prevented. As explained, this was not possible in the prior art combinations since the rollers were mechanically locked and could not automatically shift in response to load increase.

So it can be seen that the combination of the hydraulic control system and planetary gear system with the toroidal drive provides for a smooth operating completely automatic transmission in which no clutches or transmission braking is required for achieving forward, reverse and neutral ranges of automatic transmission operation and the transmission will be protected from the problem of overloading of the rollers and toroidal discs.

In FIG. 3 there is illustrated another embodiment of the invention. As shown therein there are two toroidal units comprising an input shaft 140 having fixed thereto a pair of facing input toroidal disc members 142 and 144 and having rotatably and relatively axially moveably mounted thereon a pair of output toroidal disc members 146 and 148 each respectively facing one of the input toroidal disc members 142 and 144. Between each of the separate pairs of facing toroidal disc members 142, 146 and 144, 148 there are mounted a plurality of rollers 150 each being supported on a pivot shaft 152 in a similar manner to that disclosed in relation to FIGS. 1 and 2. Cam surfaces 154 and 156 are provided either on separate cam members, as illustrated, or on the back side of each of the respective output discs 146 and 148 or fixed thereto and cam surfaces 158 and 160 are provided facing the cam surfaces 154 and 156 with a plurality of rollers 162 being provided between each pair of facing cam surfaces 154, 158 and 156, 160 so that axial loads imposed on the transmission will be transmitted through the cams and rollers into axial loading of the respective output discs 146 and 148 toward their respective input discs 142 and 144. The cam surfaces 158 and 160 may also be formed on separate cam members fixed to gears 164 and 166, which are rotatable relative to input shaft 140, or on the surfaces of said gears 164 and 166 facing the cam surfaces 154 and 156. A plurality of balls 168 are provided between the gears 164 and 166 to provide a thrust bearing therebetween. With the foregoing construction, since the input discs 142 and 144 are secured to the input shaft 144, the axial loading of the input and output discs toward each other is resisted by the shaft 140 without the addition of axial thrust bearings, except for the axial thrust bearing 168 between the gears 164 and 166.

The input shaft 140 has a gear 170 fixed thereto which meshes with gears 172 and 174 respectively fixed to shafts 176 and 178. The ratio between gears 170, 172 and 174 is substantially 1:1, as illustrated, although not necessarily so, so that the rotation of shafts 176 and 178 is substantially identical to the rotation of input shaft 140 and input toroidal discs 142 and 144. At the ends of each of the shafts 176 and 178 opposite to the ends carrying gears 172 and 174 respectively, there is fixed sun gears 180 and 182 which are part of the planetary system for each of the toroidal units. The gears 164 and 166, which are driven by the output toroidal discs 146 and 148, respectively mesh with ring gears 184 and 186, which as illustrated, is at a substantially 1:1 ratio so that the speed of rotation of ring gears 184 and 186 is substantially identical to the output speed of their associated output gears 164 and 166 and to the speed of their respective output toroidal discs 146 and 148. The ring gears 184 and 186 are suitably supported so as to be maintained in position for meshing engagement with the gears 164 and 166 with said supporting mechanism not being shown for purpose of clarity of illustration.

As further illustrated in FIG. 3, the ring gears 184 and 186 are also provided with internal gear teeth as well as the external gear teeth which mesh with gears 164 and 166. The internal gear teeth of each of the ring gears 184 and 186 are respectively in meshing engagement with a plurality of planet pinion gears 192, meshing with ring gear 184, and 194 meshing with ring gear 186. The planet pinion gears 192 and 194 are also respectively in meshing engagement with sun gears 180 and 182 carried by shafts 176 and 178. The planet pinion gears 192 and 194 are rotatably supported on trunnions which are respectively part of carriers 196 and 198. The carriers 196 and 198 are in turn fixed to output shafts 200, and 202, respectively, which shafts are analogous to output shaft 14 of the embodiment of FIGS. 1 and 2. It will be apparent from the construction so far described with respect to the embodiment of FIG. 3 that the structure is substantially similar to that of the embodiment of FIGS. 1 and 2 with the exception that two separate output drives are provided instead of only one. It will also be apparent that the outputs in the embodiment of FIG. 3 may be driven at different speeds relative to each other through the toroidal unit and planetary gearing provided for each output shaft 200 and 202.

A hydraulic control system of the type illustrated in FIG. 2 is connected to each of the pivot shafts 152 of each of the toroidal units in the embodiment of FIG. 3 in a similar manner for controlling the speed-ratio position of the rollers 150 and thus the speed-ratio output of each of said toroidal units. It should be understood, however, that a separate hydraulic control system may be provided for each of the toroidal units in FIG. 3 so that the speed-ratio of one of said units may be varied relative to the other. Such a construction may be applied to vehicle steering by deliberately varying the speed of one vehicle wheel relative to another on an opposite side of the vehicle or the vehicle or to steering a tracked vehicle such as a tank or earthmoving vehicle in a like manner.

The relationship between the hydraulic control system, the torodial units and the planetary gearing is varied somewhat from the embodiment of FIGS. 1 and 2. In the embodiment of FIG. 3 the shafts 200 and 202 are always driven by the ring gears 184 and 186 driving their associated planet pinion gears 192 and 194 with their carriers 196 and 198 around the sun gears 180 and 182. In other words no reverse drive is provided through the sun gears 180 and 182 driving the planetary gears relative to the ring gears as in the case of the prior embodiment. In the embodiment of FIG. 3 the relationship between the hydraulic control and the planetary gearing is such that, when the speed-ratio is at substantially the lowest ratio between output and input speed, which corresponds to a substantially full open position of the by-pass valve 100 wherein maximum bleed-off of the hydraulic pressure is provided, the planetary systems will function to produce a zero output of the respective shafts 200 and 202. In this embodiment no selector valve means such as valve 107 is provided for applying a fluid pressure force to the pivot shafts in a direction so as to complement the tangential traction forces F and force the rollers to a position wherein through the planetary gear system the direction of rotation of the output shafts will reverse. It will be apparent therefore, that the rotation of he shafts 200 and 202 will always be in one direction and the speed of said shafts will vary from zero r.p.m. output to a maximum speed depending on the speed-ratio output of the toroidal discs 146 and 148. Obviously however, the arrangement for controlling the output shaft speed and direction of rotation as provided in the embodiment of FIGS. 1 and 2 could be applied to the embodiment of FIG. 3.

In order to drive the wheels or tracks of a vehicle, said wheels being diagrammatically illustrated at 204 and 206 in FIG. 3, pairs of bevel gears 208, 210 and 212, 214 are respectively provided on each of the shafts 200 and 202. Each of the bevel gears 208, 210, 212 and 214 is supported on its respective output shaft 200 and 202 so as to be freely rotatable relative to its associated output shaft. Each of the pair of bevel gears 208 and 210 is in engagement with a larger bevel gear 216 which is fixed to a transverse shaft or axle 218 to which the wheel 204 is fixed for rotation. Likewise each of the pair of bevel gears 212 and 214 is in engagement with a larger bevel gear 220 fixed to transverse shaft or axle 222 which fixedly carries wheel 206.

Jaw clutches 224 and 226 are provided between each of the bevel gears 208 and 210 with each jaw clutch having an axially moveable member 228 and 230, respectively, said moveable members each being keyed to shaft 200 for rotation therewith and capable of being moved axially relative to said shaft 200 for engagement with the clutch portion on its associated bevel gear 208 and 210. Similar jaw clutches 232 and 234 with axially moveable members 236 and 238 are provided for engagement with associated bevel gears 212 and 214 on shaft 202. The axially moveable jaw clutch members 228, 230 and 236, 238 are preferably actuated into engagement with the jaw clutch portion on their associated bevel gears by means of electrically operated solenoids (not shown) but may also be activated by hydraulic means. The jaw clutches and their actuating means serve to selectively engage their associated bevel gears with the shafts 200 and 202 to drive the transverse shafts 218 and 222 in a direction depending upon which of the bevel gears is engaged as will be more fully explained hereinafter.

As stated above, the by-pass valve 100 may be adjusted so that the ratio between the speeds of the ring gears 184, 186 and the sun gears 180, 182 for a particular load on the transmission is such as to impart a zero rotation to the planetary carriers 196, 198 and their respective output shafts 200 and 202. In addition brakes 240 and 242 are provided for each of the carriers 196 and 198 for insuring that the output shafts 200 and 202 do not rotate during engagement and disengagement of the bevel gears 208, 210, 212 and 214 with the larger bevel gears 216 and 220. The brakes 240 and 242 may be actuated either hydraulically or electrically by a signal from a selector switch (not shown) or a separate means in a well known manner. When the by-pass valve 100 is moved from the neutral range so as to increase the hydraulic pressure in line 98, the solenoids (not shown) will be actuated to engage the jaw clutches 224 and 234 for coupling the bevel gears 208 and 214 into driving engagement with the shafts 200 and 202 for driving the shafts 218 and 222. At substantially the same instant the brakes 240 and 242 are disengaged to permit the carriers 196 and 198 to rotate. It will be apparent therefore, that the rotation of shafts 200 and 202 and the driving engagement of bevel gears 208 and 214 will impart rotation to the shafts or axles 218 and 222 and wheels 204 and 206 which in this case due to a clockwise rotation of input shaft 140, as viewed looking toward the left in FIG. 3, will be a forward drive or to the left as viewed in FIG. 3. The speed-ratio of the transmission will then vary in a well known manner, as described above.

When it is desired to reverse the vehicle from forward drive, the operation is as follows. The vehicle engine power is decreased and the by-pass valve 100 moved to a position wherein the transmission will be in the neutral range at which time the brakes 240 and 242 will engage to stop rotation of the shafts 200 and 202, as explained above. When the shafts 200 and 202 are at zero speed output, motion switches 244 and 246, supported at the ends of shafts 200 and 202, as illustrated, make contact. The motion switches 244 and 246 may be any well known motion switch which during rotation break a circuit and upon a stopping of rotation make contact. When the transmission is in neutral range the solenoids are inactive and jaw clutches 224, 226, 232 and 234 are disengaged. If the selector switch is now moved to a reverse driving range position the selector switch now will complete a circuit through the motion switches 244 and 246 to activate the solenoids to engage jaw clutches 226 and 232 which will drivably engage bevel gears 210 and 212 with the shafts 200 and 202, respectively. At the same time the brakes 240 and 242 will be disengaged so that the shafts 200 and 202 will rotate, which rotation is in the same direction as previously explained. However, due to the fact that the bevel gears 210 and 212 are now engaged with the larger bevel gears 216 and 220, the direction of rotation of axles 218 and 222 will be reversed from that explained previously so as to drive the vehicle in a reverse direction or to the right, as viewed in FIG. 3.

It will be apparent that the motion switches 244 and 246 serve to prevent a sudden reversal of direction of the drive while the shafts 200 and 202 are rotating in a direction for forward drive thus limiting the possibility of damage to the drive mechansm. The motion switches 244 and 246 are also to be suitably connected to the solenoids for preventing any damage when shifting from reverse driving range to forward driving range. It should also be understood, as explained above, that the jaw clutches may be actuated by means other than through solenoids, such as, for example, by a hydraulic actuated piston.

From the above description it will be seen that a novel and improved vehicle transmission system is provided. In the embodiment of FIG. 3, as explained above, no thrust bearings are needed between the toroidal units and the housing which results in a savings in size and costs of the system. Another advantage of this embodiment lies in the fact that the input torque is divided through input shafts 140, 176, and 178 and taken partly up by the two planetary systems so that only a portion of the torque goes through the toroidal units. This factor will obviously result in an increase in the operating life of these units and their related parts. Of major importance in the embodiment of FIG. 3 is the fact that no separate differential gearing is needed for controlling the separate speeds of each wheel. As also explained above, due to the separate toroidal outputs and planetary gearing for each wheel, the wheels may rotate at different speeds relative to one another without the provision of the standard differential gearing presently required in most vehicles. It should be of course understood that in the embodiment of FIG. 3 like the embodiment of FIG. 1, overloading of the units by feed-back torque is prevented through the novel combination of a toroidal drive and planetary gear means with a variable hydraulic control system.

While I have described my invention in detail in its present preferred embodiments, it will be obvious to those skilled n the art, after understanding my invention, that various changes and modifications may be made therein without departing from the spirit or scope thereof. I aim in the appended claims to cover all such modifications.

I claim:

1. A variable speed transmission comprising input means and output means; a pair of input toroidal disc members fixed to said input means; a pair of output toroidal disc members separately rotatable with respect to said input means and operably connected to said input means with each output toroidal disc member having a toric surface facing a toric surface on one of said input toroidal disc members; a plurality of circumferentially-spaced rollers disposed between said facing toric surfaces and in contact with said surfaces for transmitting torque from said pair of input toroidal disc members to said pair of output toroidal disc members, said toroidal disc members exerting a tractive force on each roller during rotation of said toroidal disc members; supporting means for each roller including pivot means providing for speed-ratio-changing movement of said rollers across said toric surfaces, each roller support means also including means providing form movement of its roller in a second mode such that in response to movement of said roller in said second mode speed-ratio-changing movement of said roller is initiated; a planetary gear system comprising a pair of planetary gear sets, each planetary gear set including a first gear member for one of said output toroidal disc members, a second gear member drivingly connected to one of a pair of input shafts of said input means, and a plurality of planet pinion gears meshing with said first and second gear members and drivingly connected to one of a pair of output shafts of said output means; and means including a variable hydraulic control pressure source for applying an equal hydraulic force on each roller for producing movement of said rollers in said second mode in response to changes in the relative magnitude of said traction forces so that each of said output shafts will rotate in accordance with the relative speeds of its associated first and second gear members.

2. A variable speed transmission as recited in claim 1 further comprising a pair of driving shafts each having its axis of rotation transverse to the axis of said output shafts, said driving shafts each having surface engaging driving means secured thereto; and means for transmitting torque from said output shafts to said driving shafts and including means for selectively reversing the direction of rotation of said driving shafts.

3. A variable speed transmission comprising a plurality of input shafts and a plurality of output shafts; a pair of input toroidal members supported on one of said input shafts and each having a toric surface thereon; a pair of output toroidal members, each operatively connected to an output shaft and each having a toric surface facing the toric surface of one of said input toroidal members; a plurality of circumferentially-spaced rollers disposed between facing toric surfaces of said input and output toroidal members and in contacting engagement therewith for transmitting torque from each of said input toroidal members to its associated output toroidal member; support means for each roller including a pivot shaft providing for speed-ratio-changing movement of said rollers across said toric surfaces, each roller support means also including means providing for movement of its roller in a second mode such that in response to movement of said rollers in said second mode speed-ratio-changing movement of said rollers is initiated; planetary gear means connected between each said output toroidal member and its associated output shaft, said planetary gear means including first gear members with each first gear member drivingly connected for rotation with an associated output toroidal member, second gear members with each second gear member being supported for rotation with one other of said input shafts, and a set of planet pinion members connected to each of said output shafts with each said set of planet pinion members being supported for meshing engagement with an associated first gear member and an associated second gear member and for rotation relative to said first and second gear members such that the relative speed of rotation of each of said output shafts is determined by the relative speed of its associated set of planet pinion members; control means including a variable hydraulic control pressure source for initiating speed-ratio-changing movement of said rollers for varying the relative speed of each said output toroidal members and its associated ring gear; output gear means supported on each said output shaft; driving gear means supported on driving shafts having their axis of rotation transverse relative to said output shafts, said output gear means including a pair of output gears for each said output shaft with one of said gears of each pair of output gears being supported for driving engagement with an associated driving gear for one direction of rotation of said driving shafts and another of said gears of each pair of output gears being supported for driving engagement with an associated driving gear for a second direction of rotation of said driving shafts; and means for selectively engaging either of said output gears of each of said pair of output gears with its associated driving gear for transmitting torque from said output shafts to said driving shafts and for controlling the direction of rotation of said driving shafts.

References Cited by the Examiner

UNITED STATES PATENTS

| | | | |
|---|---|---|---|
| 1,222,911 | 4/1917 | Watkins | 180—6,7 X |
| 1,978,439 | 10/1934 | Sharpe | 74—691 |
| 1,984,830 | 12/1934 | Higley | 74—720.5 X |
| 2,060,884 | 11/1936 | Madle | 74—691 |
| 2,086,491 | 7/1937 | Dodge | 74—691 |
| 2,164,504 | 7/1939 | Dodge | 74—690 |
| 2,178,859 | 11/1939 | Jett et al. | 74—690 |
| 2,311,393 | 2/1943 | Honeywell | 180—6.66 |
| 2,716,357 | 8/1955 | Rennerfelt | 74—691 |
| 2,874,591 | 2/1959 | Thoma | 74—720.5 |
| 3,008,337 | 11/1961 | Kraus | 74—200 |
| 3,087,348 | 4/1963 | Kraus | 74—200 |
| 3,163,050 | 12/1964 | Kraus | 74—200 |

FOREIGN PATENTS

| | | |
|---|---|---|
| 551,818 | 6/1932 | Germany. |
| 450,246 | 7/1936 | Great Britain. |

DAVID J. WILLIAMOWSKY, *Primary Examiner.*

J. R. BENEFIEL, *Assistant Examiner.*